June 25, 1957 M. BRODSKY 2,797,273
AUTOMATIC INDICATING DEVICE OF THE VARIATION OF
PRESSURE OF THE INNER TUBE OF TIRES
Filed May 18, 1954 2 Sheets-Sheet 2
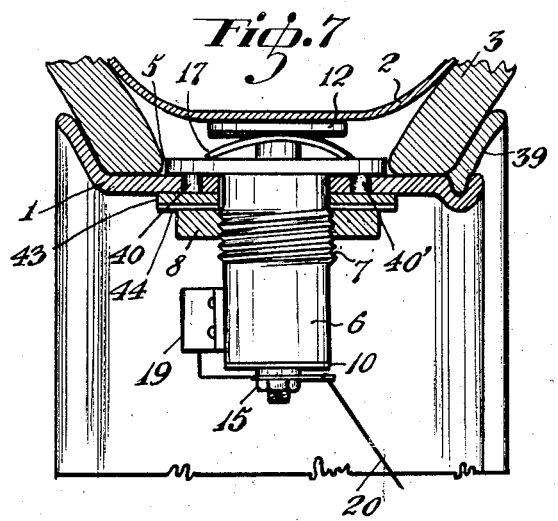
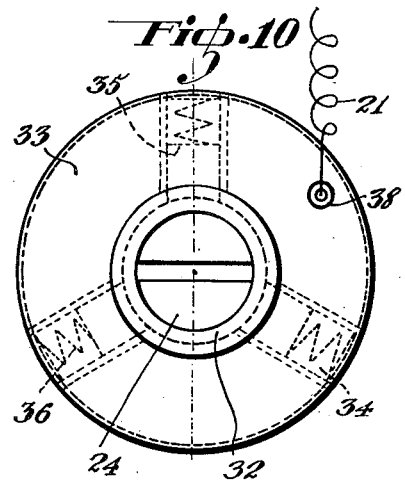
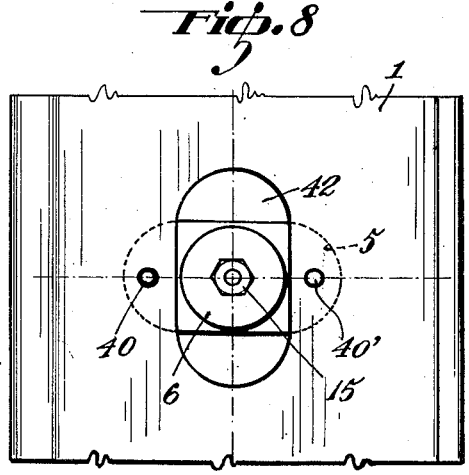
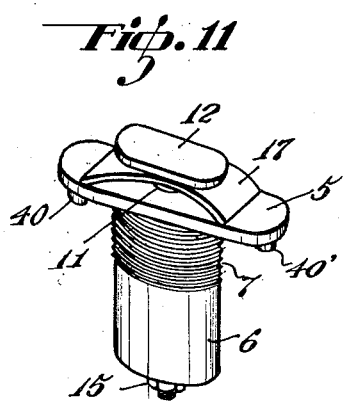
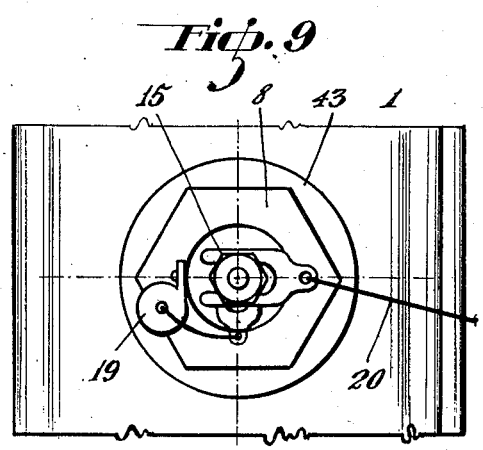
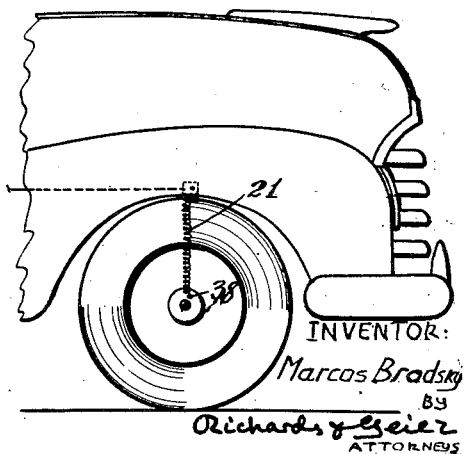
INVENTOR:
Marcos Brodsky
BY
Richards y Geier
ATTORNEYS United States Patent Office 2,797,273
Patented June 25, 1957

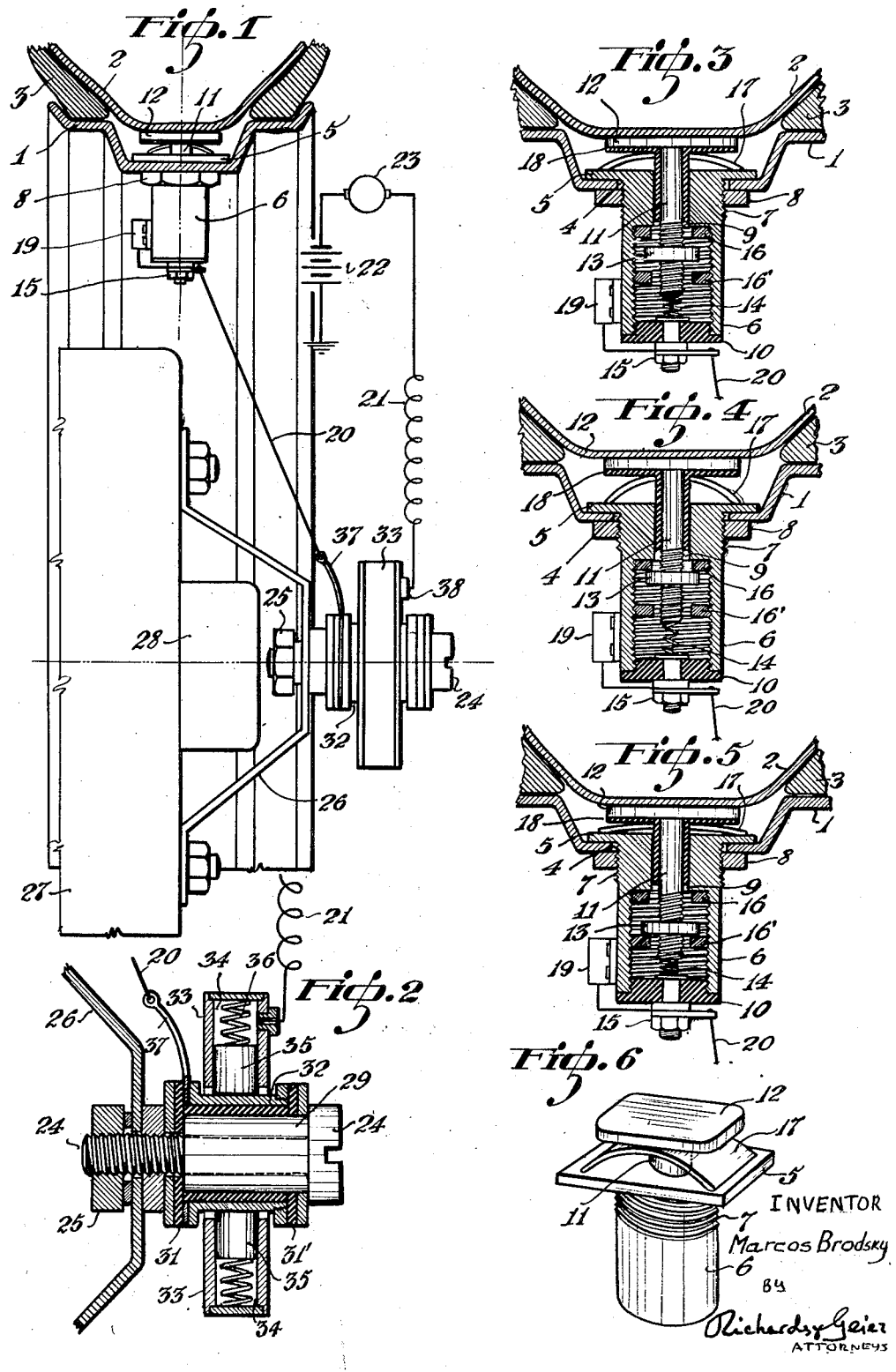

2,797,273

AUTOMATIC INDICATING DEVICE OF THE VARI-ATION OF PRESSURE OF THE INNER TUBE OF TIRES

Marcos Brodsky, Buenos Aires, Argentina

Application May 18, 1954, Serial No. 430,714

4 Claims. (Cl. 200—61.26)

The present invention refers to an automatic indicating device for the variation of pressure in the inner tube of tires, and has as its object the combination of adequate means for indicating, at the opportune moment, the eventual loss of air in the inner tubes, or else the increase of the pressure, produced by accidental causes, due to punctures, and excessive heating of the roadway respectively.

Therefore the primary objective of the invention is to provide a highly efficient indicating means of the above mentioned class, capable of indicating with precision the under or over inflation of the tire.

Another important objective of the invention is to provide a device of the above mentioned type, which may be readily secured in position on the rim of the wheel. Still a further object is to eliminate the possibility of foreign matters to enter the device, thus rendering it susceptible of perturbing the normal operation of the device.

Still another object of this invention is to embody means by which the operable parts may be easily and readily replaced. The device is immune to the effects of centrifugal force, even at extremely high speeds of the vehicle.

The device is based fundamentally upon the insertion of a curved elastic laminar member between the inner air tube and the outer or external pneumatic tire which is pierced by a guided and insulated sliding pin guided and insulated. The device terminates at one of its ends with a plate disposed in direct contact with the above mentioned inner tube and is provided at its other end, with a contact member capable of closing an electrical circuit fed by the battery of the automobile and in which a visible or audible alarm indicator is inserted. It is located in a hollow body of a conducting material fixed externally to the rim. The radius of curvature of the aforementioned elastic laminar member is conditioned to a predetermined normal magnitude of air pressure contained in the inner tube, so that under these conditions the contact member of the sliding pin remains centrally situated at a neutral point between two fixed contacts disposed in the above mentioned conducting hollow body. The fixed contacts are connected to the chassis ground, or negative pole of the car battery. The sliding pin is electrically connected to the live pole of the battery through a collector device mounted in alignment with the axle of the wheel.

It is evident then, that when the air pressure diminishes in the interior of the inner tube of the pneumatic tire, the elastic laminar member will produce the displacement of a sliding pin in a given direction and will thereby cause the closing of the electrical circuit referred to above. An increase of pressure will produce the displacement of the sliding pin in the opposite direction, due to the flexibility of the elastic laminar member, and will produce a similar effect to that described above.

Briefly, the primary objective of the present invention is to provide a device to be applied between the inner air tube and the outer pneumatic tire, in which a set of contacts are disposed in such a manner so as to close the circuit of an electrical alarm indicator fed by the battery of the vehicle. One of the contacts is movable with respect to a pair of fixed contacts and capable of yielding elastically when the internal pressure of the air contained in the inner tube increases or diminishes. Contact occurs electrically and alternatively provokes one or the other of the fixed contacts, thereby closing the circuit of the alarm indicator. This is either a visual and audible alarm, in order to indicate the existence of an abnormal condition to the driver.

In order that the present invention may be clearly understood and easily put into practice, it has been presented in its preferable form of execution in the accompanying drawings, and in which:

Figure 1 represents a side elevation of a fragmentary and transverse sectional view of an automobile wheel showing the novel device, of this invention.

Figure 2 is a side elevation of an amplified sectional view, of the wheel axle showing the collector device mounted and aligned axially with the wheel.

Figure 3 shows a view of a longitudinal cross-section of the indicating device pertaining to the present invention, showing the sliding pin and its associated contact when the pressure of the pneumatic tire is normal.

Figure 4 is a longitudinal cross-section of the indicating device showing the relative position of the elements when the pressure of the air contained in the inner tube of the tire has diminished and closing the circuit of the alarm indicator.

Figure 5 is a longitudinal cross-section of the indicating device, and shows the position of the elements when an increase of air pressure occurs in the inner tube.

Figure 6 represents a perspective view of the top part of the sliding pin, showing its widening position upon contact with the inner tube of the tire, its curved elastic laminar member and its surrounding case for holding and guiding the same.

Figure 7, similar to the top zone of the illustration of Figure 1, which shows a variation in the realization of the indicating device showing its application to a truck or van wheels of heavy vehicles which are provided with drop-center detachable rim type of wheel.

Figure 8 shows a partial view of the rim base showing the zone corresponding to the perforation for allowing the passage of the top end of the sliding pin, and retaining flange of the sustaining and guiding hollow body.

Figure 9 represents a view of Figure 1 according to the cross-section marked by line A—B.

Figure 10 shows a front view of the collector device mounted in axial alignment with the axle of the wheel.

Figure 11 shows a perspective view, similar to that shown in Figure 6, of the top end of the sliding pin and its guiding and sustaining body.

Figure 12 is a side elevation of a fragmentary view of an automobile showing the indicator device applied to it.

In all the above mentioned drawings, the same reference numbers indicate equal or similar parts.

Referring to the drawings, number 1 indicates the rim of a drop-center type of wheel usually employed in light vehicles. Reference numerals 2 and 3 indicate respectively, the inner tube and the outer pneumatic of the tire mounted on the rim. The base of this latter has a perforation 4 (Figures 3, 4, 5 and 8) whose internal edge rests on a protruding flange 5 formed by the top end of a hollow conducting body 6. The body 6 is open at both ends and is formed preferably of circular cross-section, provided externally with a threaded section 7 on which a nut 8 is threaded and constitutes the retaining means of said body 6 against the rim 1 in a radial position.

The hole is internally threaded in the hollow body 6 and forms at the top a narrowing or strangulation 9, where as at its opening underneath it is closed by the threaded plug 10 made of insulating material. Axially, in the interior of the hollow body 6, a sliding metallic pin is placed 11 whose top end is duly guided by the aforementioned strangulation 9; projects outside of same and terminates in a widening portion constituted by the plate 12 which rests directly against the inner air tube 2 of the tire. Its bottom end is threaded, and carries a nut 13 to join a terminal 15, due to a helical spring 14 to a terminal 15. The terminal 15 passes centrally through the insulating plug 10, and projects outside the hollow body 6 by its under side. A pair of annular independent contacts 16 and 16' are threaded and are of a fixed nature. Between the contacts is situated the nut 13 which forms a moving contact member since it accompanies pin 11 in its axial displacement.

Between the underneath face of plate 12 of the top end of the sliding pin 11 and the platform formed by the protruding flange 5 of the hollow body 6, a curved elastic laminar member 17 is placed. The laminar member 17 is capable of maintaining (with a predetermined normal pressure of the air contained in the inner tube of the tire) the movable contact 13 in an intermediate position (Figure 3), between the pair of annular fixed contacts 16 and 16', or else expand (Figures 4 and 5 respectively) in case of an abnormal decrease or increase in the above mentioned pressure. The movable contact 13 will make electrical contact and alternately with either one or the other of the fixed contacts.

The top part of the sliding pin 11 guided in the strangulation of the hollow body 6 and the lower face of plate 12, are provided with a covering of insulating material 18, while between the terminal 15 and the hollow body 6, a spark-quenching capacitor 19 has been inserted.

As can be seen in Figures 3, 4 and 5, the sliding pin 11 is electrically connected to the collector device as illustrated in detail in Figure 2, by means of the helical spring 14, terminal 15 and the insulated conductor 20. From the collector device an extensible conductor 21 is connected to the live pole of the battery 22 of the vehicle with the insertion of the alarm indicator 23 which may be either visible or audible (Figure 1). The fixed contacts 16 and 16' in the interior of the hollow body 6 are connected to the chassis or to the negative pole of the aforementioned battery.

The above mentioned collector device (Figures 1 and 2) consists of a screw 24, secured by means of a nut 25, to a supporting member 26 of U-shape which is rigidly fixed to the external front face of the hub of the wheel 27. The screw 24 is axially disposed and aligned with the axle 28 of the wheel, and has screwed to its front portion a fixed bushing 29 electrically insulated by means of the sleeve 30 and insulating washers 31 and 31' from a metallic annular sleeve 32 which surrounds it and upon which is freely disposed an annular disk 33. The disk 33 has a series of perforations 34 radially disposed in its body. In the bottom of each disk 33 is placed an equal number of carbon brushes 35 which are held elastically by means of helical springs 36 interposed between same and the cover of the above mentioned perforations. Between the edge of the metallic sleeve 32 nearest the U support, a terminal 37 is inserted to which is connected the insulated conductor 20. It is electrically joined to the inside terminal 15 of the hollow body 6, while the rotating disk 33 is provided with a terminal 38 which is connected by means of the extensible conductor 21 to the live pole of the battery 22, with the insertion of the alarm indicator 23.

As was established previously, in the case of the rims of truck wheels or similar heavy vehicles, which are usually of the type illustrated in Figure 7, a drop-center plane base 1 is provided with a retaining ring 39. The upper flange 5 of the hollow body 6 adopts a slightly oblong form (Figure 11). It is provided at its under side surfaces towards the respective extremities of its major axis, with the studs 40 and 40', that are destined to fit into the corresponding perforations 41 and 41' (Figure 8). The perforations 41 and 41' are made at both sides of the opening 42 (of a similar form) in the rim 1, and their openings constitute the zone for passing the upper end of the hollow body 6. Once the latter has been inserted in the above mentioned aperture, it will be sufficient to rotate it through an angle of 90° so that the corresponding studs and retaining holes coincide. The remaining uncovered sectors of the above mentioned perforation are closed by means of a packing made of elastic material 43 (Figures 7 and 9) disposed against the external under side of the rim 1, a metallic washer 44 is fitted between the said packing and the retaining nut 8.

In practice and in order to preclude the entrance of dust and dirt, the portion of the device which is inside the pneumatic tire, that is, the plate 12, elastic laminar member 17 and projecting flange 5 are enveloped in a rubber covering or similar substance (not shown in the drawings), which satisfactorily accomplishes the expressed function.

What I claim is:

1. An air pressure switch comprising a cylindrical body open at both ends and having threads internally at one end and a protruding flange at the other end, an insulated metallic pin carried slidably centrically through said body and having a widened contact portion at one end and a threaded portion at the other end, said widened contact portion superposed on said protruding flange, two annular fixed contact points concentrically equidistantly disposed within said body, a nut carried upon said threaded portion and disposed intermediate said contact points, a curved laminar member carried coaxially with said pin intermediate said protruding flange and said widened contact portion, said laminar member adapted to engage said nut selectively upon at least one of said fixed contact points, when said pressure is altered upon said pin.

2. An air pressure switch in accordance with claim 1 wherein said body has an insulating plug threaded to one end thereof.

3. An air pressure switch in accordance with claim 1 wherein said metallic pin has a helical spring connected intermediate the threaded end portion and said insulating plug.

4. An air pressure switch in accordance with claim 1 wherein said body has a spark-quenching capacitor connecting said insulating plug.

References Cited in the file of this patent

UNITED STATES PATENTS

| | | |
|---|---|---|
| 1,137,116 | Brown | Apr. 27, 1915 |
| 1,294,923 | Long | Feb. 18, 1919 |
| 2,113,474 | Edmonston et al. | Apr. 5, 1938 |
| 2,249,426 | Jones et al. | July 15, 1941 |
| 2,451,412 | Richbourg | Oct. 12, 1948 |
| 2,520,241 | Geraci et al. | Aug. 29, 1950 |
| 2,524,968 | Eriksen et al. | Oct. 10, 1950 |